(12) United States Patent
Wu et al.

(10) Patent No.: US 8,786,959 B2
(45) Date of Patent: *Jul. 22, 2014

(54) AUTO-FOCUSING CAMERA MODULE AND AUTO-FOCUSING METHOD USING SAME

(75) Inventors: Sung-Ching Wu, New Taipei (TW); Ting-Yuan Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,371

(22) Filed: Jun. 18, 2012

(65) Prior Publication Data

US 2013/0163095 A1   Jun. 27, 2013

(30) Foreign Application Priority Data

Dec. 27, 2011 (TW) .............................. 100148765 A

(51) Int. Cl.
  *G02B 15/14* (2006.01)
(52) U.S. Cl.
  USPC .......................................... 359/698; 348/345

(58) Field of Classification Search
  USPC ......................................................... 359/698
  See application file for complete search history.

(56) References Cited

U.S. PATENT DOCUMENTS

2013/0162849 A1* 6/2013 Wu et al. .................... 348/208.4

\* cited by examiner

*Primary Examiner* — James Jones
(74) *Attorney, Agent, or Firm* — Novak Druce Connolly Bove + Quigg LLP

(57) ABSTRACT

An auto-focus camera module includes an lens module, an image sensor, a color separation unit, a main processor unit and an image processing unit. The lens module captures an image of object. The image sensor receives the image captured by the lens module. The color separation unit separates the image into red, green and blue colors. The main processor unit calculates MTF values of the sensed image and determines a shooting mode of the AF camera. The image processing unit processes the image according to the MTF values to compensate for any blurring of the image caused by being out of focus. The driving unit drives the lens module to the point of optimal focus on the object according to MTF values.

11 Claims, 2 Drawing Sheets

AUTO-FOCUSING CAMERA MODULE AND AUTO-FOCUSING METHOD USING SAME

BACKGROUND

1. Technical Field

The present disclosure relates to an auto-focusing (AF) camera module and an AF method using the AF camera module.

2. Description of Related Art

Digital AF technology allows blurred images (out of focus images) to be processed by software modules, which may employ an extended depth of field (EDOF) technology, to achieve a sharper image. However, the digital AF technology does not work properly if the distance to the object is short, e.g. less than 40 cm.

What is needed therefore is an AF camera module and AF method using the camera module addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
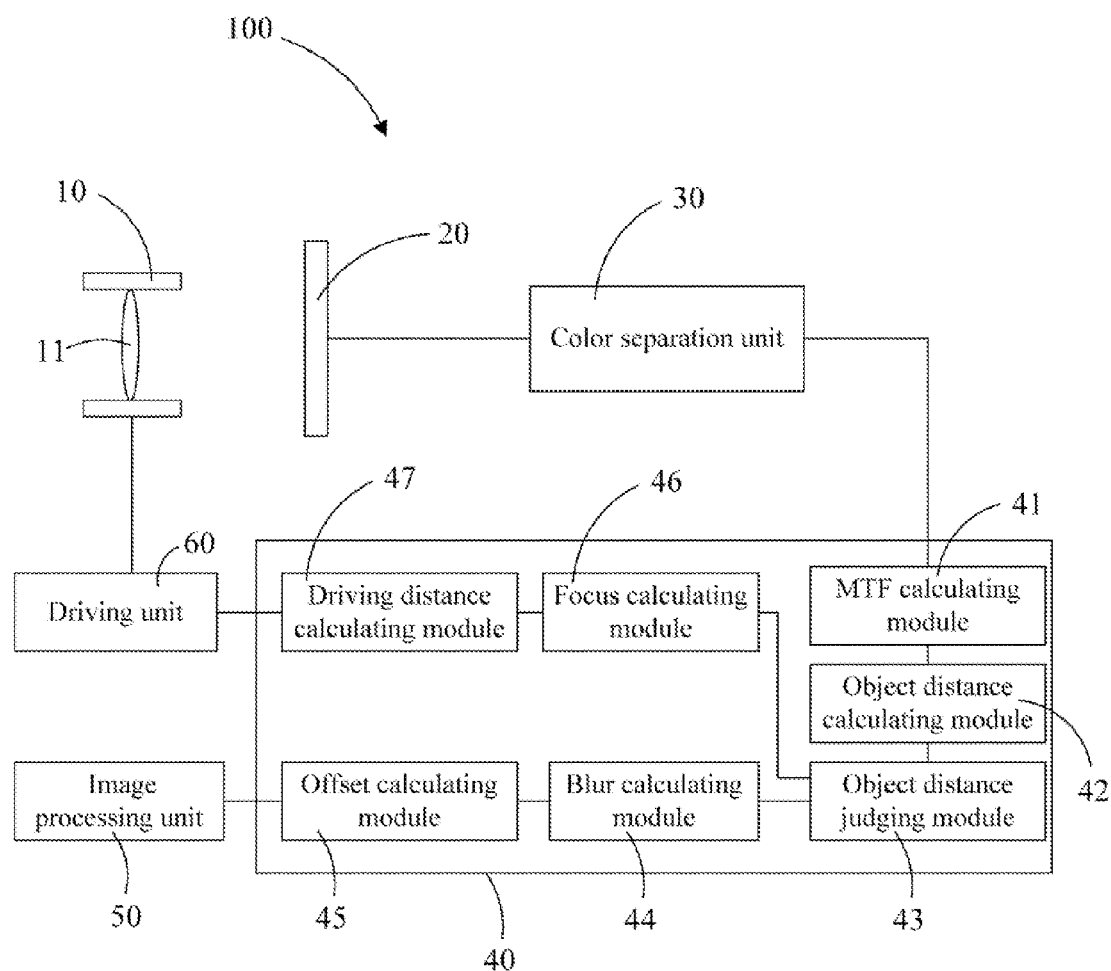
FIG. 1 is a schematic view of an AF camera module, according to an exemplary embodiment of the present disclosure.

Referring to FIG. 1, an AF camera module 100, according to an exemplary embodiment of the present disclosure, is shown. The AF camera module 100 includes an lens module 10, an image sensor 20, a color separation unit 30, a main processor unit 40, an image processing unit 50, and a driving unit 60. A center of the image sensor 20 is aligned with an optical axis of the lens module 10. The color separation unit 30 is electrically connected to the image sensor 20, the main processor unit 40 is electrically connected to the color separation unit 30, and the image processing unit 50 and the driving unit 60 are both electrically connected to the main processor unit 40. The driving unit 60 is also connected to the lens module 10.

The lens module 10 captures images of an object(s) and focuses the images onto a sensing area of the image sensor 20. The lens module 10 includes at least one lens 101. In this embodiment, each of the at least one lens 101 is an aspherical lens.

The image sensor 20 senses the images captured by the lens module 10. The image sensor 20 includes a number of pixel units arranged in the sensing area, each pixel unit includes a red pixel, a green pixel and a blue pixel. In one embodiment, the number of the pixel units 20 is not less than 2048×1536. In this illustrated embodiment, the image sensor 20 can be a charge-coupled device (CCD) or a complementary metal oxide semiconductor (CMOS). An image sensed overall by the image sensor 20 comprises a number of image portions corresponding to the pixel units.

The color separation unit 30 separates a sensed image into red, green and blue colors. In detail, each image portion of the image is separated into a red color part, a green color part and a blue color part, the red color parts of the image portions construct the image in red, the green parts of the image portions construct the image in green, and the blue parts of the image portions construct the image in blue.

The main processor unit 40 includes a modulation transfer function (MTF) calculating module 41, an object distance calculating module 42, an object distance judging module 43, a blur calculating module 44, an offset calculating module 45, a focus calculating module 46 and a driving distance calculating module 47. The MTF calculating module 41 is electrically connected to the color separation unit 30, the object distance calculating module 42 is electrically connected to the MTF calculating module 41, the object distance judging module 43 is electrically connected to the object distance calculating module 42, the focus calculating module 46 and the blur calculating module 44 are electrically connected to the object distance judging module 43, the offset calculating module 45 is electrically connected to the blur calculating module 44 and the image processing unit 50, and the driving distance calculating module 47 is electrically connected to the focus calculating unit 46 and the driving unit 60.

The MTF calculating module 41 calculates MTF values of each image portion of an image sensed by the image sensor 20. In this embodiment, the MTF calculating module 41 respectively calculates MTF values of the red parts, the green parts and the blue parts of each image portion.

The object distance calculating module 42 calculates an object distance of an object in each image portion of the image according to the MTF values calculated by the MTF calculating module 41.

The object distance judging module 43 determines a shooting mode according to the object distances calculated by the object distance calculating module 41. In detail, the object distance judging module 43 analyzes the object distances calculated by the object judging module 43, compares the results with a predetermined distance value(s), and determines the shooting mode. In this embodiment, the object distance judging module 43 analyzes the object distances of the pixel units and generates a main object distance representing the distance-to-object distance of a main object in the image. The predetermined distance value is used for distinguishing the shooting mode of the AF camera module 100, in this embodiment, the predetermined distance value is 40 cm, if the main object distance is more than 40 cm, the AF camera module 100 is set at a long shooting mode, and if the main object distance is equal to or less than 40 cm, the AF camera module 100 is set at a close shooting mode.

The blur calculating module 44 compares the MTF values of each image portion of the image calculated by the MTF calculating module 41 with corresponding predetermined MTF values, calculates the differences between the MTF values of each image portion and the predetermined MTF values, and generates blur quantities of each image portion of the image. The predetermined MTF values are those values applying to the object in the image which is the sharpest, and the predetermined MTF values are different corresponding to different object distances. In this embodiment, the blur calculating module 44 calculates the blur quantities of the red part, of the green part and of the blue part of each image portion. The blur calculating module 44 may select on state or off state for the blur calculating function according to the shooting manner determined by the object distance judging module 43. In this embodiment, if the AF camera module 100 is set at a long shooting mode, the blur calculating module 44 switches on the blur calculating function, and if the AF camera module 100 is set at a close shooting mode, the blur calculating module 44 switches off the blur calculating function.

The offset calculating module 45 calculates offsets to compensate for any blurring of each image portion according to the result achieved by the blur calculating module 44. In this embodiment, the offset calculating module 45 calculates offsets of the red part, of the green part and of the blue part of each image portion.

The focus calculating module 46 calculates an optimum focus of the lens module 10 according to the calculation of the object distance calculating module 42. The focus calculating module 46 may select on state or off state for the focus calculating function thereof according to the shooting mode determined by the object distance judging module 43. In this embodiment, if the AF camera module 100 is set at a long shooting mode, the focus calculating module 46 switches off the focus calculating function, and if the AF camera module 100 is set at a close shooting mode, the focus calculating module 46 switches on the focus calculating function.

The driving distance calculating module 47 calculates a driving distance to be applied to the lens module 10 according to the optimum focus calculated by the focus calculating module 46.

The image processing unit 50 processes the image according to the calculation of the offset calculating module 45 to achieve a sharper processed image. In detail, the image processing unit 50 compensates for any blurring of each image portion of the image according to the offsets calculated by the offset calculating module 45. In this embodiment, the image processing unit 50 compensates for any blurring of the red color portion, of the green color portion and of the blue color portion of each image portion.

The driving unit 60 drives the lens module 10 to the position for optimum focus according to the driving distance calculated by the driving distance calculating module 47. In this embodiment, the driving unit 60 is a piezoelectric actuator. Alternatively, the driving unit 60 can be a voice coil motor (VCM).

Figure 2:
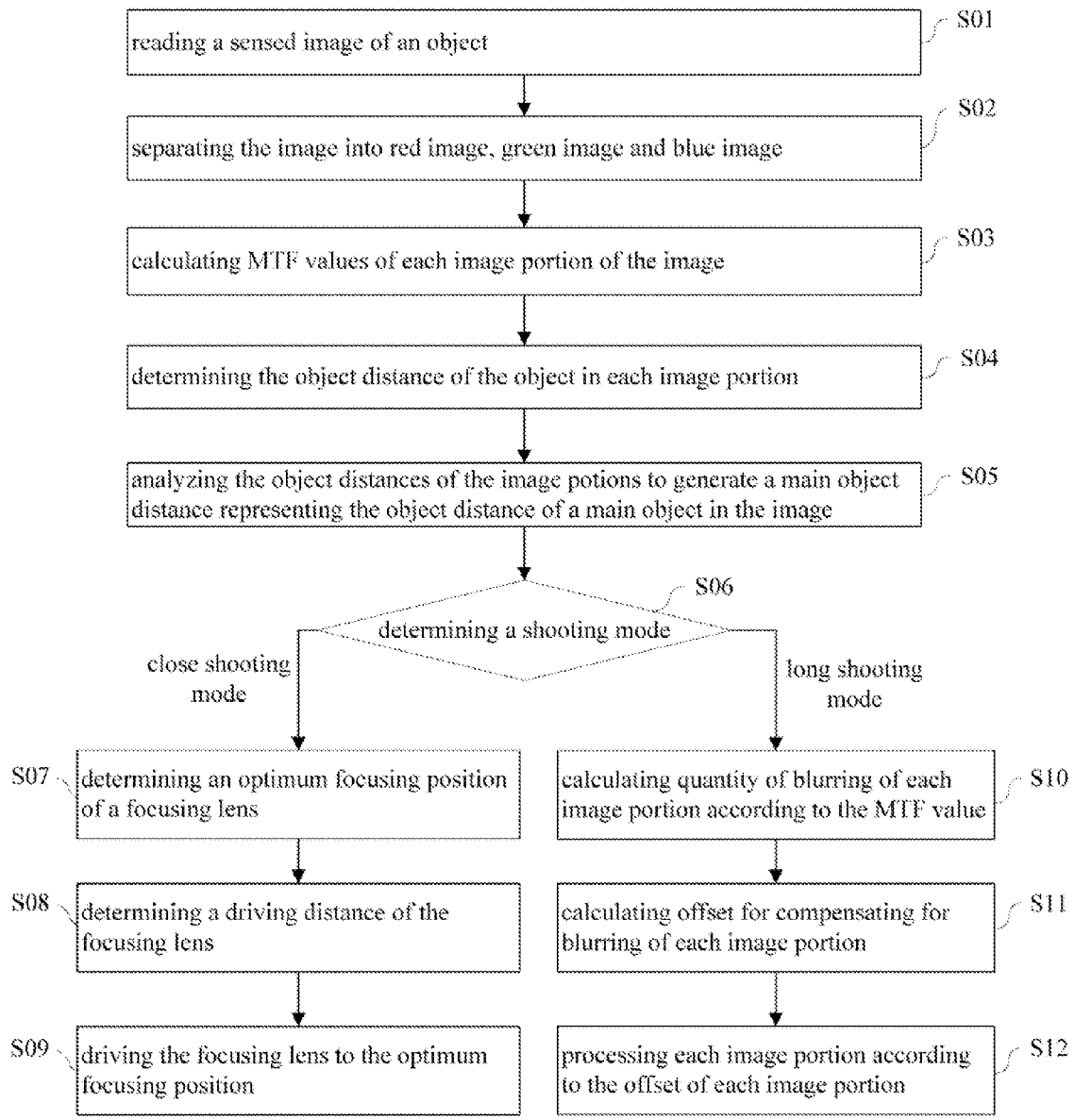
FIG. 2 is a flowchart of an AF method, according to an exemplary embodiment of the present disclosure.

Referring to FIG. 2, an exemplary embodiment of an AF method using the AF camera module 100 is shown. The AF method includes the following steps:

In step S01, an image sensed by the image sensor 20 is read.

In step S02, the image sensed by the image sensor 20 are separated into red, green and blue colors. Each image portion of the image is separated into a red color part, a green color part and a blue color part.

In step S03, MTF values of each image portion of the image are calculated. The MTF values of the red part, the green part and the blue part of each image portion are calculated.

In step S04, the object distance of the object in each image portion is determined according to the MTF values of each image portion.

In step S05, a main object distance representing the object distance of a main object in the image is generated by analyzing the object distances of the image potions.

In step S06, a shooting mode of the AF camera module 100 is determined according to the object distance of the object in each image portion.

If the AF camera module 100 is set at a close shooting mode, the steps immediately following are executed, if not the process goes to step 8:

In step S07, an optimum focusing position of the at least one lens 101 is determined according to the object distance of the object in each image portion.

In step S08, a driving distance of the at least one lens 101 is determined according to the optimum focusing position.

In step S09, the at least one lens 101 is driven to the optimum focusing position according to the driving distance. Then, the AF camera module 100 can capture a properly focused image.

If the AF camera module 100 is set at a long shooting mode, the following step are executed:

S10, the quantity of blurring of each image portion is calculated according to the MTF values.

S11, offset for compensating for the blurring of each image portion is calculated according to the quantity of blurring of each image portion.

S12, each image portion is processed according to the offset of each image portion. Then, the processed image can be stored as a properly focused image.

The AF camera module 100 and the AF method using the AF camera module 100 determine a shooting mode according the distance to an and either a mechanical manner or a digital manner of adjustment may be applied, thus a sharp image can be generated whether the distance to an object is short or not.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An AF camera module comprising:
   an lens module for capturing an image of an object;
   an image sensor aligned with the lens module for sensing the image captured by the lens module;
   a color separation unit electrically connected to the image sensor and configured for separating the image sensed by the image sensor into red image, green image and blue image;
   a main processor unit electrically connected to the color separation unit, the main processor unit being configured for calculating MTF values of the image and determining a shooting mode of the AF camera, wherein the shooting mode comprises a close shooting mode and a long shooting mode;
   an image processing unit electrically connected to the main processor unit, the image processing unit processing the image according to the MTF values calculated by the main processor unit to compensate blurs of the image caused by out of focus when the long shooting mode is selected; and
   a driving unit electrically connected to the main processer unit, the driving unit moving the lens module to an optimum focusing position according to the MTF values calculated by the main processor unit when the close shooting mode is selected.

2. The AF camera module of claim 1, wherein the lens module comprises at least one piece of aspherical lens.

3. The AF camera module of claim 1, wherein the image sensor comprises a plurality of pixel unit arranged in its sensing area, each pixel unit comprises a red pixel, a green pixel and a blue pixel, the image sensed by the image sensor comprises a plurality of image portions, each of which corresponds to a pixel unit, each image portion of the image is separated into a red color part, a green color part and a blue color part, the red color parts of the image portions construct a red image, the green parts of the image portions construct a green image, and the blue parts of the image portions construct a blue image.

4. The AF camera module of claim 3, wherein the main processor unit comprises:

a MTF calculating module configured for calculating MTF values of each image portion of the image;

an object distance calculating module configured for calculating an object distance of an object in each image portion of the image according to the MTF values;

an object distance judging module configured for determining the shooting mode according to the object distances;

a blur calculating module configured for comparing the MTF values of each image portion calculated by the MTF calculating module with corresponding predetermined MTF values, generating the differences between the MTF values and the predetermined MTF values, and generating blur quantities of each image portion of the image according to the MTF value differences;

an offset calculating module configured for calculating offset to compensate a blur of each image portion according to the blur quantities;

a focus calculating module configured for calculating an optimum focusing position of the lens module according to the object distance of the object in each image portion; and a driving distance calculating module configured for calculating a driving distance of the lens module according to the optimum focusing position calculated by the focus calculating module.

5. The AF camera module of claim 4, wherein the MTF calculating module respectively calculates MTF values of each image portion of the red image, the green image and the blue image.

6. The AF camera module of claim 5, wherein the object distance judging module analyzes the object distances calculated by the object judging module to get an analysis result, compares the analysis result with a predetermined distance value, and determines the shooting mode.

7. The AF camera module of claim 6, wherein the object distance judging module analyzes the object distances of the image potions and generates a main object distance representing the object distance of a main object in the image.

8. The AF camera module of claim 7, wherein the predetermined distance value is 40 cm, if the main object distance is more than 40 cm, the AF camera module is set at the long shooting mode, and if the main object distance is equal to or less than 40 cm, the AF camera module is set at the close shooting mode.

9. The AF camera module of claim 1, wherein the driving unit is a piezoelectric actuator.

10. An AF method, comprising:
reading a sensed image of an object;
separating the image into red image, green image and blue image, wherein the image comprises a plurality of image portions;
calculating MTF values of each image portion of the image;
determining an object distance of the object in each image portion according to the MTF values of each image portion;
analyzing the object distances of the image potions to generate a main object distance representing the object distance of a main object in the image;
selecting a close shooting mode upon a condition that the main object distance is equal to or less than a predetermined distance value;
determining an optimum focusing position of a focusing lens according to the object distance of the object in each image portion;
determining a driving distance of the focusing lens according to the optimum focusing position; and
driving the focusing lens to the optimum focusing position according to the driving distance.

11. The AF method of claim 10, comprising:
calculating quantity of blurring of each image portion according to the MTF values;
calculating offset for compensating for blurring of each image portion according to the quantity of blurring of each image portion; and
processing each image portion according to the offset of each image portion.

* * * * *